(12) United States Patent
Curtin, IV

(10) Patent No.: US 12,254,540 B2
(45) Date of Patent: Mar. 18, 2025

(54) FREQUENCY INTERVAL VISUALIZATION EDUCATION AND ENTERTAINMENT SYSTEM AND METHOD

(71) Applicant: Sonaria 3D Music, Inc., Scottsdale, AZ (US)

(72) Inventor: Cornelius J Curtin, IV, Scottsdale, AZ (US)

( * ) Notice: Subject to any disclaimer, the term of this patent is extended or adjusted under 35 U.S.C. 154(b) by 233 days.

(21) Appl. No.: 17/823,597

(22) Filed: Aug. 31, 2022

(65) Prior Publication Data
US 2024/0070941 A1 Feb. 29, 2024

(51) Int. Cl.
| | | |
|---|---|---|
| *G06T 11/20* | (2006.01) | |
| *G06T 15/10* | (2011.01) | |
| *G10G 1/00* | (2006.01) | |
| *G09B 5/02* | (2006.01) | |
| *G09B 15/00* | (2006.01) | |

(52) U.S. Cl.
CPC ............ *G06T 11/206* (2013.01); *G06T 15/10* (2013.01); *G10G 1/00* (2013.01); *G06T 2200/24* (2013.01); *G09B 5/02* (2013.01); *G09B 15/00* (2013.01)

(58) Field of Classification Search
CPC ... G06T 11/206; G06T 15/10; G06T 2200/24; G10G 1/00; G09B 5/02; G09B 15/00
See application file for complete search history.

(56) References Cited

U.S. PATENT DOCUMENTS

| | | | | |
|---|---|---|---|---|
| 5,075,880 | A * | 12/1991 | Moses ..................... | G06F 17/17 708/290 |
| 5,092,216 | A * | 3/1992 | Wadhams ............ | G10H 1/0008 84/602 |
| 5,225,618 | A * | 7/1993 | Wadhams .............. | G09B 15/00 84/645 |
| 5,467,401 | A * | 11/1995 | Nagamitsu .............. | H04S 7/302 381/63 |
| 5,497,435 | A * | 3/1996 | Berger ................... | H04N 19/60 375/240.1 |
| 5,901,708 | A * | 5/1999 | Chang ................. | G01S 15/8925 600/443 |
| 5,902,948 | A * | 5/1999 | Haruyama ............. | G09B 15/00 84/649 |
| 6,031,172 | A | 2/2000 | Papadopoulos | |
| 6,323,408 | B1 * | 11/2001 | Liu ......................... | G10H 1/44 84/451 |
| 6,330,486 | B1 * | 12/2001 | Padula .................... | G06F 3/011 381/310 |
| 6,411,289 | B1 * | 6/2002 | Zimmerman .......... | G09B 15/00 345/419 |
| 6,429,863 | B1 * | 8/2002 | LoPiccolo ........... | A63F 13/5375 345/419 |
| 6,686,529 | B2 | 2/2004 | Kim | |
| 6,831,220 | B2 * | 12/2004 | Varme ..................... | G10G 1/00 84/464 R |
| 6,995,310 | B1 * | 2/2006 | Knapp ................... | G09B 5/065 84/645 |
| 7,820,900 | B2 * | 10/2010 | Lemons ............... | G09B 15/026 345/23 |
| 7,928,306 | B2 | 4/2011 | Lemons | |
| 7,932,454 | B2 * | 4/2011 | Lemons ................. | G10L 13/00 84/464 R |

(Continued)

*Primary Examiner* — Charles L Beard
(74) *Attorney, Agent, or Firm* — Michael Campillo

(57) ABSTRACT

A system and method for transforming assessed frequency characteristics into three-dimensional visualizations.

20 Claims, 12 Drawing Sheets

(56) References Cited

U.S. PATENT DOCUMENTS

| | | | | |
|---|---|---|---|---|
| 7,932,455 B2* | 4/2011 | Lemons | G10H 1/0008 | 84/464 R |
| 7,947,888 B2 | 5/2011 | Lemons | | |
| 7,994,409 B2 | 8/2011 | Lemons | | |
| 8,018,459 B2 | 9/2011 | Lemons | | |
| 8,073,701 B2* | 12/2011 | Lemons | G09B 15/02 | 704/276 |
| 8,088,985 B1* | 1/2012 | Bowser | G10H 1/0008 | 84/477 R |
| 10,755,683 B1* | 8/2020 | Baltazor | G10H 1/368 | |
| 10,775,941 B2* | 9/2020 | Heath | A63B 71/0622 | |
| 11,756,515 B1* | 9/2023 | Pereverzev | G10G 1/04 | 84/609 |
| 2003/0222977 A1* | 12/2003 | Yoshino | H04N 13/395 | 348/51 |
| 2004/0237756 A1* | 12/2004 | Forbes | G09B 15/02 | 84/477 R |
| 2005/0190199 A1* | 9/2005 | Brown | G10H 3/125 | 345/600 |
| 2006/0107826 A1* | 5/2006 | Knapp | G10H 1/0066 | 84/724 |
| 2006/0274144 A1* | 12/2006 | Landschaft | H04M 19/04 | 348/14.01 |
| 2007/0009115 A1* | 1/2007 | Reining | H04R 1/326 | 381/122 |
| 2007/0143268 A1* | 6/2007 | Chosokabe | G11B 27/105 | |
| 2007/0243915 A1* | 10/2007 | Egozy | G09B 5/06 | 463/7 |
| 2008/0002844 A1* | 1/2008 | Chin | G11B 27/34 | 381/310 |
| 2008/0022842 A1* | 1/2008 | Lemons | G09B 15/009 | 84/483.2 |
| 2008/0143751 A1* | 6/2008 | Chosokabe | G06F 16/64 | 345/654 |
| 2008/0245211 A1* | 10/2008 | Lemons | G09B 15/00 | 84/470 R |
| 2008/0245212 A1* | 10/2008 | Lemons | G09B 15/02 | 84/483.2 |
| 2008/0259083 A1* | 10/2008 | Lemons | G06T 11/206 | 345/440 |
| 2008/0264238 A1* | 10/2008 | Lemons | G10H 1/44 | 84/477 R |
| 2008/0264241 A1* | 10/2008 | Lemons | G10L 21/06 | 84/645 |
| 2008/0270904 A1* | 10/2008 | Lemons | G10L 21/06 | 715/716 |
| 2008/0274443 A1* | 11/2008 | Lemons | G09B 19/06 | 434/157 |
| 2008/0314228 A1* | 12/2008 | Dreyfuss | G09B 15/00 | 84/477 R |
| 2009/0164225 A1* | 6/2009 | Cho | G10L 19/008 | 704/E21.001 |
| 2009/0223349 A1* | 9/2009 | Lemons | G06T 11/206 | 84/483.2 |
| 2010/0110072 A1* | 5/2010 | Nakayama | G06T 13/205 | 345/473 |
| 2010/0137049 A1* | 6/2010 | Epstein | A63F 13/44 | 463/7 |
| 2011/0096073 A1* | 4/2011 | Adhikari | G10H 1/368 | 345/426 |
| 2011/0187718 A1* | 8/2011 | Diara | G10H 1/0008 | 345/440.1 |
| 2011/0191674 A1* | 8/2011 | Rawley | G06F 3/016 | 715/702 |
| 2011/0273438 A1* | 11/2011 | Liu | G06T 11/206 | 345/419 |
| 2012/0097012 A1* | 4/2012 | Kurihara | H04R 29/008 | 84/464 R |
| 2013/0000463 A1* | 1/2013 | Grover | G09B 15/00 | 84/483.2 |
| 2013/0148812 A1* | 6/2013 | Corteel | H04R 5/04 | 381/17 |
| 2013/0214485 A1* | 8/2013 | Dupree | G09B 15/00 | 273/123 R |
| 2014/0310011 A1* | 10/2014 | Biswas | G10L 19/038 | 704/500 |
| 2015/0071447 A1* | 3/2015 | Sen | G10L 19/008 | 381/23 |
| 2015/0332690 A1* | 11/2015 | Kim | G10L 19/008 | 704/222 |
| 2016/0042657 A1* | 2/2016 | Granger | G10H 1/0008 | 84/477 R |
| 2016/0042740 A1* | 2/2016 | Jiang | H04S 3/002 | 381/23 |
| 2016/0203805 A1* | 7/2016 | Strachan | G10H 1/0025 | 84/483.2 |
| 2017/0105081 A1* | 4/2017 | Jin | G10H 1/368 | |
| 2018/0047372 A1* | 2/2018 | Scallie | G06F 3/04815 | |
| 2018/0174559 A1* | 6/2018 | Elson | G10H 1/20 | |
| 2018/0197551 A1* | 7/2018 | Mcdowell | H04S 7/30 | |
| 2018/0270600 A1* | 9/2018 | Boehm | H04S 1/007 | |
| 2018/0359594 A1* | 12/2018 | Maeno | H04R 5/02 | |
| 2020/0120326 A1* | 4/2020 | Deshpande | H04N 21/816 | |
| 2021/0043172 A1* | 2/2021 | Yamagiwa | G10G 1/00 | |
| 2021/0289309 A1* | 9/2021 | Herre | H04S 7/303 | |
| 2021/0314724 A1* | 10/2021 | Murata | H04R 5/02 | |
| 2022/0029721 A1* | 1/2022 | Jackson | H04L 7/0079 | |
| 2022/0030374 A1* | 1/2022 | Suyama | G06F 3/0312 | |
| 2022/0208212 A1* | 6/2022 | Liao | H04S 7/40 | |
| 2022/0357417 A1* | 11/2022 | Kim | G01S 11/14 | |
| 2022/0377489 A1* | 11/2022 | Herre | H04S 7/302 | |
| 2023/0123105 A1* | 4/2023 | Iezzi | H04B 1/1027 | 375/346 |
| 2023/0300532 A1* | 9/2023 | Spittle | G06F 3/165 | 381/1 |
| 2023/0421977 A1* | 12/2023 | Araujo-Simon | G06F 30/20 | |

\* cited by examiner

FREQUENCY INTERVAL VISUALIZATION EDUCATION AND ENTERTAINMENT SYSTEM AND METHOD

FIELD OF THE INVENTION

The present invention relates to methods and systems for displaying music for educational or entertainment.

SUMMARY OF THE INVENTION

The present disclosure enables a system for display of a visualization of sound energy in an audible input. The system may be implemented in a hardware and software combination, the comprised of an audio processing filter that may be implemented in hardware or software and that is configured to filter time-domain assessed frequency characteristics for a plurality of distinct note-frequencies in the sound energy, the time-domain assessed frequency characteristics including magnitude and duration at each distinct frequency assessed, the audio processing filter coupled to a processor configured to transform the time-domain assessed frequency characteristics for the plurality of distinct frequencies into three-dimensional coordinates, a graphics processing unit to generate graphics processing data to display a visualization of the time-domain assessed frequency characteristics wherein the visualization includes a first surface comprised of a first set of coordinates transformed from a first set of the plurality of distinct frequencies and a second surface comprised of a second set of coordinates transformed from a second set of the plurality of distinct frequencies.

Aspects may be implemented in a system wherein the first and or second set of coordinates are positioned on or form a plane or cone.

Additional aspects may be implemented in a system wherein the plurality of distinct frequencies correspond to musical notes and the first set of the plurality of distinct frequencies comprises a first octave and the second set of the plurality of distinct frequencies comprises a second octave, and the musical notes may be Western 12-note scale notes, a Middle Eastern scale tones, an Indian scale tones, and Chinese Scale tones, a custom scale, or a combination thereof.

Additional aspects of the disclosure include transformation of sound energy to three-dimensional coordinates create a matrix or visualization of the sound energy wherein each set of three-dimensional coordinates includes a magnitude coordinate that is proportional to the magnitude at each distinct frequency assessed, a radial coordinate that is proportional to the time elapsed between successive coordinates, a first angle coordinate common to the first set of coordinates and a second angle coordinate common to the second set of coordinates.

The present disclosure also enables a method of producing a three-dimensional visualization of an audio input. In the method, and for each of a plurality of distinct frequencies, the method includes sampling the audio input to determine a relative magnitude characteristic proportional to the sound energy present at the distinct frequency sampled and sequence of occurrence characteristic, transforming each sample of relative magnitude characteristic and sequence of occurrence characteristic into a set of coordinates for which each of the plurality of distinct frequencies includes a unique polar angle coordinate and azimuth angle coordinate combination, converting each set of coordinates into graphics display data, and producing a graphical three-dimensional visualization of the graphics display data.

Aspects of the method disclosed also enables including in each set of coordinates also includes a relative magnitude coordinate that corresponds to the magnitude of sound energy at each distinct frequency assessed by the system, or each set of coordinates may alternately comprise a magnitude coordinate proportional to the magnitude of the sound energy in the audio input at each distinct frequency, and a radial coordinate proportional to the occurrence of the sample relative to other samples.

Aspects of the method enable visualizations wherein a first range of the plurality of distinct frequencies have a common first polar angle coordinate and a second range of the plurality of frequencies have a common second polar angle coordinate, and the graphical three-dimensional visualization comprises a first surface composed of the coordinates from the first range of the plurality of distinct frequencies and a second surface composed of the coordinates from the second range of distinct frequencies. Additional aspects include assigning a unique azimuthal angle coordinate for each distinct frequency within the first range of the distinct frequencies, and the same azimuth angle coordinate to an integer multiple of the distinct frequency in the second range of the distinct frequencies.

Additional aspects enabled by the disclosure include graphical user interface control of the system to create a visual display of the audio energy in an audio source, the system configured to transform the audio energy at a plurality of distinct frequencies into coordinates for a three-dimensional display of the audio energy. The interface may include a control to define a time interval between successive coordinates for the three-dimensional display, a control for selecting a music scale selected from Western 12-note scale notes, a Middle Eastern scale tones, an Indian scale tones, and Chinese Scale tones, a custom scale, or a combination thereof.

Numerous advantages and features of the present invention will become readily apparent from the following detailed description of the invention and the embodiments thereof, from the claims and from the accompanying drawings.

Figure 1:
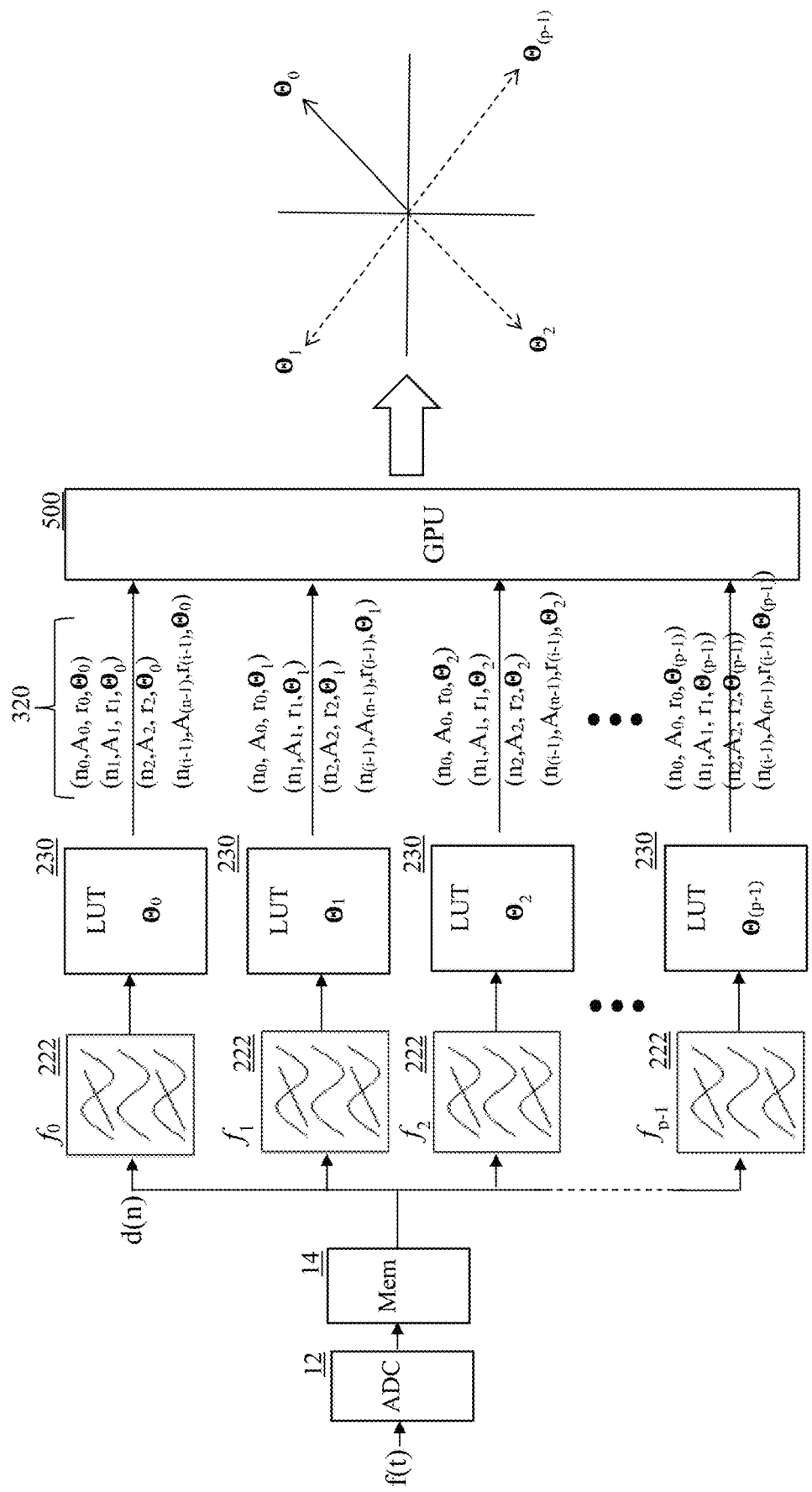
FIG. 1 illustrates a block diagram of an embodiment of a processing system for determining time-domain assessed audible characteristics including a plurality of narrow bandpass filters 222 to filter a plurality of distinct frequencies and transform the plurality of distinct frequencies by a plurality of look-up tables (LUT) 230 into a matrix including a plurality of two-dimensional (e.g., polar) coordinates that may be converted by a graphics processing unit (GPU) 500 into graphics processing data to enable a computer visualization of the time-domain assessed audible characteristics for each distinct frequency, such as the graphing of the coordinates illustrated.

The objects, features and advantages of the present invention will be more readily appreciated upon reference to the following disclosure when considered in conjunction with the accompanying drawings, wherein reference numerals are used to identify the components in the various views.

DESCRIPTION OF PREFERRED EMBODIMENTS

The figures illustrate an embodiment of a three-dimensional visualization system for audible inputs or audio data incorporating aspects of the invention. The features of the disclosed embodiment(s) should not be construed as limiting any aspect of the invention, however. The aspects of the invention disclosed may be scaled or modified for all types of analog or digital inputs and it is contemplated that adaptions of the teachings of this disclosure enable visualization of captured analog audio, streamed, or stored digital audio, interpreted sheet music, or of the output from any instrument or input device capable of creating MIDI output data. The embodiments disclosed comprise hardware and software systems for visualization of audio content, which may be live audio, recorded audio, audio encoded in any digital protocol or format, and other audio or musical formats capable of being interpreted by a software or hardware translator or interpreter. In preferred embodiments, the systems enable visualization of frequencies within the audible spectrum so that the systems facilitate visual analysis of the frequencies for study or entertainment purposes.

Figure 2:
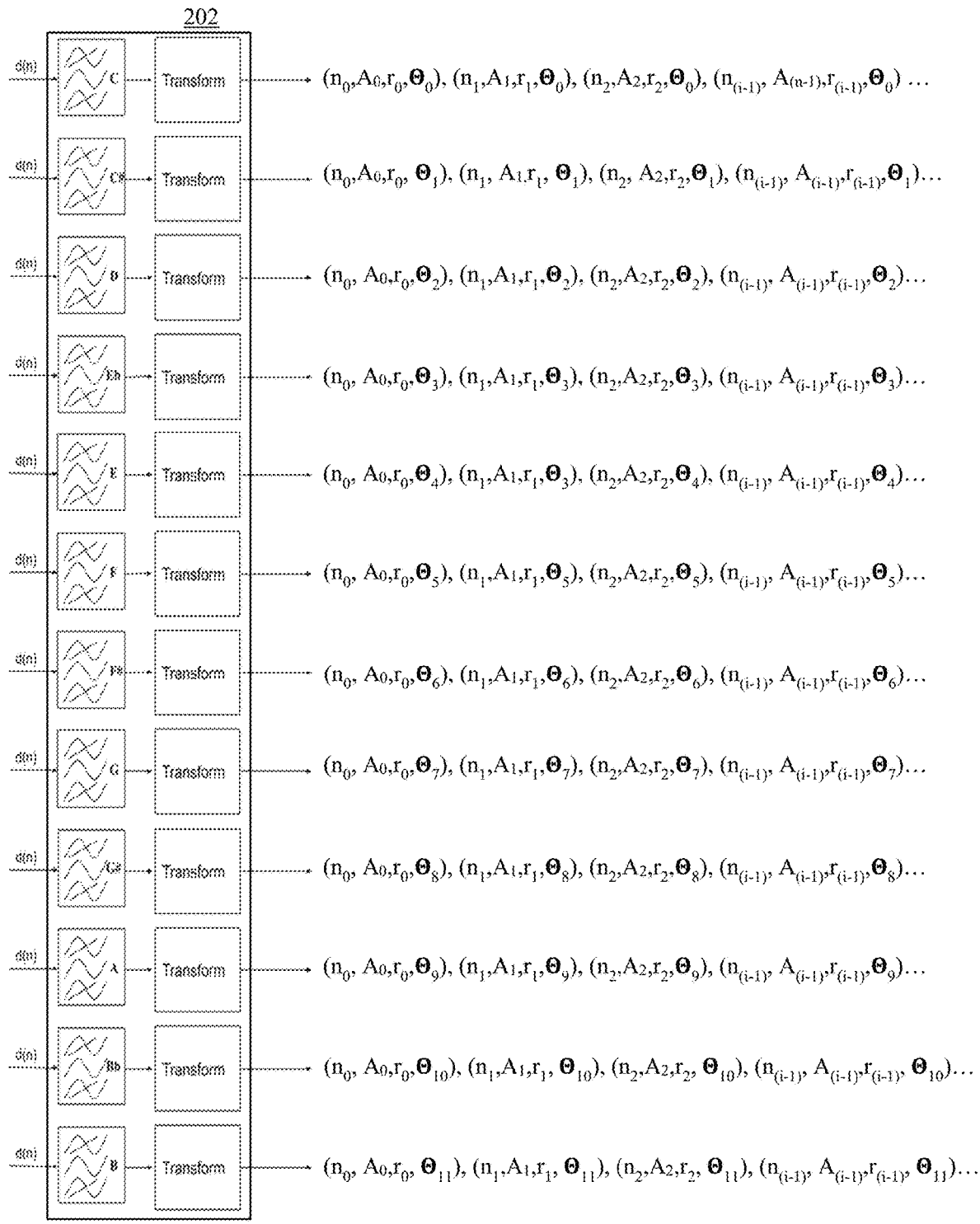
FIG. 2 illustrates a embodiment of audio processing filter comprised of a plurality of narrow bandpass filters 222 and transformational process (e.g., LUT or mathematically calculated) to transform the distinct frequencies of an octave of musical notes into a matrix or plurality of three-dimensional coordinates (e.g., spherical) that may be converted by a graphics processing unit (GPU) 500 into graphics processing data to enable a computer visualization of the time-domain assessed audible characteristics for each distinct frequency.

An embodiment of a system may comprise an audio processing filter 20 configured to filter time-domain assessed audible characteristics for a plurality of distinct frequencies 25, and a process to transform the time-domain assessed audible characteristics for the plurality of distinct frequencies 25 into graphics processing data 27 that may be rendered for display or visualization of the assessed audible characteristics. As one example, the assessed audible characteristics may generate graphics processing data 27 to generate a three-dimensional visualization that comprises a radial geometric image 304. One manner of capturing and creating assessed audible characteristics comprises sampling the audio and processing the representative data by audio processing filter 20 that comprises a plurality of narrow bandpass filters 222, each tuned to filter the specific frequency that is to be assessed. FIG. 2 illustrates the concept to generate assessed frequency characteristics.

FIG. 2 illustrates a conceptual block diagram of the audio filtering and processing functions of a system embodiment of a visualization system as it may be implemented for analog audible sound energy inputs. The illustrated embodiment includes a transformation of the audible characteristics to produce a two-dimensional visual representation of the audible characteristics present in the analog audio stream at a plurality of narrow bandpass filters 222 to a representative set of coordinates for display or other visualization.

In the embodiment illustrated in FIG. 2, the system receives an analog audio stream "f(t)" that is sampled, such as by an analog to digital converter (ADC) 12 and stores the data set "d(n)" in system memory 14. The system software directs the data set for subsequent filtering and processing to create the visual representation. In the embodiment, at least one, but preferably a plurality of narrow bandpass filters 222 each process the data set to pass a distinct frequency for subsequent transformation and visualization. The system enables both preprogrammed and user control of each of the plurality of narrow bandpass filter 222 specifications, including specifications such as the center frequencies (e.g., $f_0$, $f_1$, etc.) or band of frequencies to pass for each filter 222, the gains and attenuation of each filter 222. The data output from the filters 222 is then subsequently transformed to produce a visual representation of the audible characteristics present in the analog audio input to the system. Although mathematically calculated transformations of the filter 222 outputs are possible, a mapped or look-up table transformation provides an equivalent for conceptual system design. The illustrated two-dimensional visualization embodiment include a plurality of look-up tables 230 that map the output characteristics of each filter 222 to representative information or data that may be stored in system memory for subsequent analysis or directed to the graphical processing unit (GPU) 500 for graphics processing and output to a display or other device enabling visualization.

Figure 3:
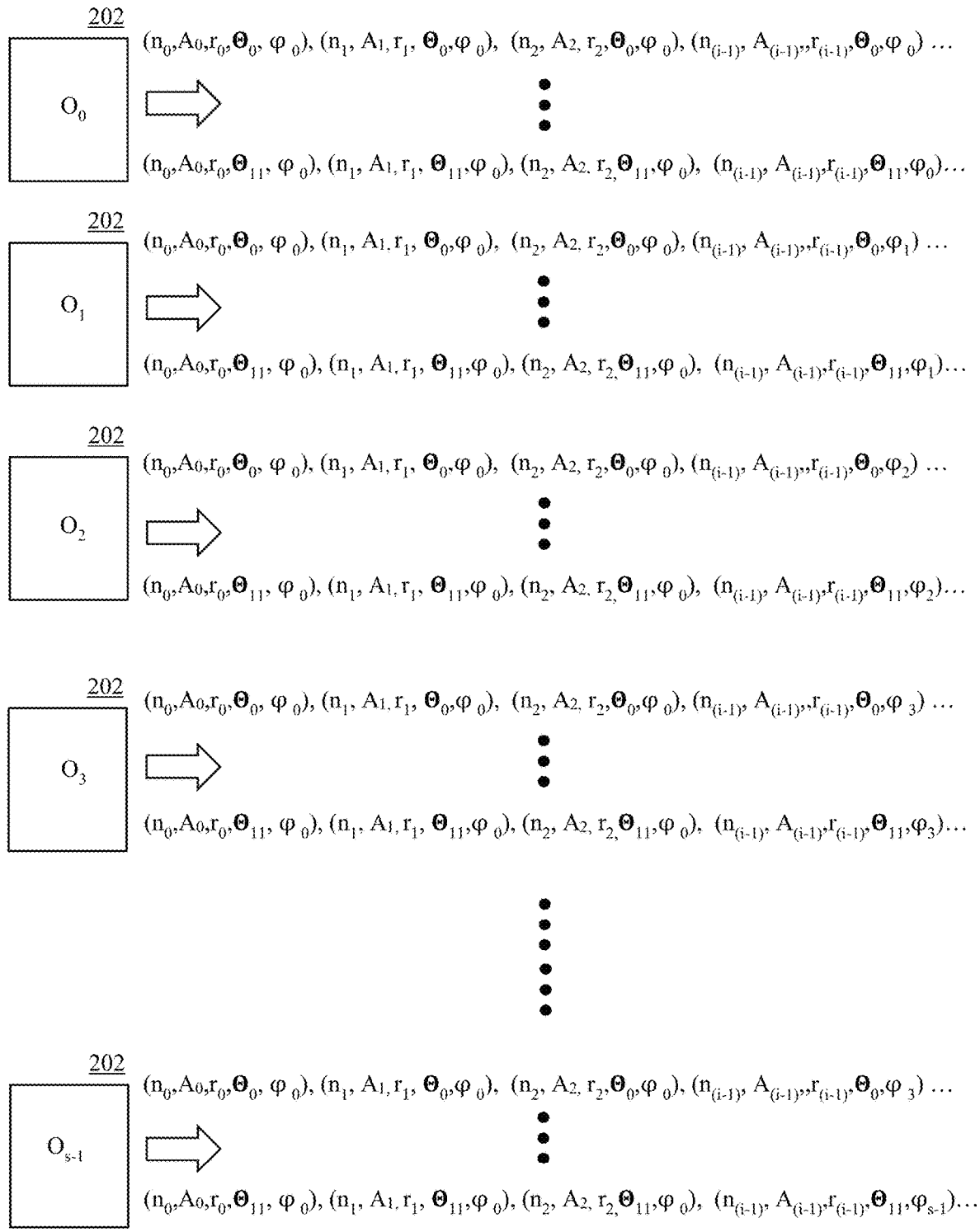
FIG. 3 illustrates a processing system comprised of a plurality of audio processing filters 202 (such as the filters illustrated in FIG. 2) to generate a matrix of a plurality of spherical coordinates for a plurality of distinct frequencies, such as specific notes or tones, in a plurality of octaves from $O_0$ to $O_{(s-1)}$.

In the illustrated conceptual block diagram in FIG. 2, the transforms implemented by the look-up tables 230 map the data output from each narrow bandpass filter 222 to representative information or data comprised of two-dimensional spatial coordinates and an index coordinate that is based on or related to the time-domain. The two-dimensional coordinates may be two dimensional cartesian coordinates, or as illustrated, polar coordinates. In the example, each sample of data for the frequency represented by a particular narrow bandpass filter 222 is transformed or mapped to polar coordinates comprised of an interval index (e.g., $n_0$, $n_1$, $n_2$, $n_{(i-1)}$, ... where "i" is the number of data points), which may be a coordinate related to the time domain, a radial coordinate (e.g., $r_0$, $r_1$, $r_2$, $r_{(i-1)}$, ... where "i" is the number of data points), corresponding to the distance to or from the origin and an angle coordinate "theta" (e.g., $\theta_0$, $\theta_1$, $\theta_2$, ... $\theta_{(p-1)}$, where 'p' is the number of angles selected for use in the transformation or mapping) that is relative to a reference axis such as the polar axis. As an example, if the audio input to the system has the pure tone or single frequency that corresponds to one of the narrow bandpass filters 222, the system will generate and output coordinates from the associated look-up table 230 (e.g., "$\theta_0$") for display by the GPU 500 and may include any number of set of coordinates that correspond to number of samples of that single tone or frequency. In the illustrated example, the set of coordinates is displayed as a vector extending from the origin for the distance "r" and at the angle, "$\theta_0$", which may represent a tone corresponding to "$f_0$". Further, in certain preferred embodiments, the radial coordinate (e.g., $r_0$, $r_1$, $r_2$, $r_{(i-1)}$, ... where "i" is the number of data points) is equivalent to the interval index (e.g., $n_0$, $n_1$, $n_2$, $n_{(i-1)}$, ... where "i" is the number of data points), so that the radial coordinate grows proportionately as the elapsed time increases. Further, if the audio input to the system comprises two tones or two single frequencies that each correspond to one of the narrow bandpass filters 222, the system will create and output coordinates from two of the corresponding narrow bandpass filters 222, which may be displayed as described or which may be subject to additional mathematically processing, such as polar coordinate addition, multiplication, averaging, etc., such that the two sets of coordinates may be combined to create a single set of coordinates that may be graphed or converted to graphics processing data 27 for display and visualization. The system design of FIG. 2 may be further modified or scaled to include additional narrow bandpass filters 222 tuned to additional distinct frequencies, such as the embodiment illustrated in FIG. 3, which comprises an octave processing filter that generates coordinates that enables a system for two-dimensional visualization of the frequencies, pitches, or notes of one octave for music expressed in the Western chromatic (or twelve note) scale. For purposes of illustration, in the system based on a two-dimensional visualization each pitch (i.e., C, C #, D, Eb, E, F, F #, G, G #, A, Bb, and B) is represented by a specific angle (i.e., $\theta_0$, $\theta_1$, $\theta_2$, ... $\theta_{11}$) and polar coordinates may be generated that map the notes in the analog or digital music input and from a chosen octave into a two-dimensional visualization of the assessed frequency characteristics. In the embodiment, the system design includes a plurality of narrow bandpass filters 222, each of the filters 222 tuned to one of the pitches and matched with an associated look-up table 230 configured to map or transform the assessed sampled and filtered audio data, "d(n)", to polar coordinates with a chosen specific angle, $\theta_0$, $\theta_1$ $\theta_2$, ... $\theta_{11}$, and to generate graphics processing data 27 for the two-dimensional visualization of the audio input to the system.

In yet another preferred embodiment, the two-dimensional visualization system design is adapted according to the description and enables a system for three-dimensional visualization of time domain based audible characteristics for a plurality of distinct frequencies by mapping or transforming the characteristics to spherical coordinates that may be converted to graphics processing data 27 for display. In one such three dimensional visualization embodiment, an audio processing filter 20 (see FIG. 3) may comprise plurality of frequency range or octave processing filters (i.e., at least two sets of a plurality of the audio processing filters 202 illustrated in FIG. 3), wherein each of the audio processing filters 202 that comprises an octave processing filter is designed to process the time-domain assessed audible characteristics for each distinct frequency 206 in one octave in the Western chromatic (or twelve note) scale (i.e., "$O_0$, $O_1$, $O_2$, $O_3$, ... $O_{s-1}$). Each of the audio processing filters 202 that comprises an octave processing filter is comprised of plurality of narrow bandpass filters 222 and look-up tables 230, such as in FIG. 2, that collectively process the time-domain assessed audible characteristics for each distinct frequency 206 comprising one of the tones of the Western scale in one octave to generate a matrix of three-dimensional or spherical coordinates. The time-domain assessed audible characteristics for each distinct frequency 206 are transformed into a matrix of three-dimensional coordinates wherein each coordinate set includes an indexing coordinate "n" that corresponds to the order of and sample number, an amplitude or loudness coordinate "A" that is proportional to the amplitude or magnitude of the audio characteristics at the distinct frequency assessed, a radial coordinate "r" (distance to origin) that is related to "n" and is proportional to the time elapsed between successive coordinates, a polar angle coordinate "$\theta$" (theta) (angle with respect to polar axis) that is determined based on the system design and user selection or determination of a representative angle, and an azimuthal angle coordinate "$\varphi$" (phi) (angle of rotation from the initial meridian plane) that is determined based on the system design and the user selection or determination of a representative angle, e.g., ($n_0$, $A_0$, $r_0$, $\theta_0$, $\varphi_0$), ($n_1$, $A_1$, $r_1$, $\theta_0$, $\varphi_0$), ($n_2$, $A_2$, $r_2$, $\theta_0$,$\varphi_0$), ..., ($n_{i-1}$, $A_{(i-1)}$, $r_{(i-1)}$, $\theta_{(s-1)}$, $\varphi_{(i-1)}$) where: "i" is the index for the number of coordinates; "s" is the number or quantity of frequency ranges (e.g. octaves) that the system will transform into coordinates for visualization; and "p" is the number of tones, notes, or distinct frequencies assessed within or per each of the frequency ranges (e.g., the 12 notes in the Western note scale). In preferred system embodiments, the system generates a visualization based on a transformation of at least two distinct frequencies (or notes) and for at least wo octaves, e.g., ($n_0$, $A_0$, $r_0$, $\theta_0$, $\varphi_0$), ..., ($n_1$, $A_1$, $r_1$, $\theta_1$, $\varphi_1$). As one example, the frequencies from a first set of frequencies or octave may be represented as a first set of coordinates corresponding with a first surface and the frequencies from a second set of frequencies may be represented as a second set of coordinates corresponding with a second surface. Moreover, the three-dimensional coordinates may have the same origin (see e.g., FIGS. 4-7), different origins, and the same or different axes, such as angled axes (e.g., orthogonal in FIG. 7) from a common vertical axis. In the illustrated visualization examples, the frequencies from a first range of frequencies (e.g., a first octave) may be transformed or mapped to a first surface that may be a first cone (e.g., $\theta \neq 0$ and $\varphi \neq 0$), or a plane (e.g., $\theta \neq 0$ and φ=0), and the frequencies from a second set of frequencies (e.g., a second octave) may be represented as coordinates in or on a second cone (e.g., θ≠0 and φ≠0). Further, in preferred embodiments, the first set of frequencies may represent the notes or tones in a first octave of a recognized music scale, and the second set of frequencies may represent the notes or tones in a second octave of the recognized music scale, wherein the recognized music scale designated by the user or may be preprogrammed by the system designer for user selection from a Western 12-note, an Indian 22-note, a Middle-Eastern 8-note[1], a Chinese 5-note, or a custom scale specified by the user or a third-party. As an example, the user may select the Western-scale notes as the plurality of distinct frequencies that will be subject to assessment of the audible characteristics. The frequencies in Hertz of the first four octaves of the twelve Western-scale notes (i.e., C, C #, D, Eb, E, F, F #, G, G #, A, Bb, and B) are included in Table 1 below.

TABLE 1

Frequencies (Hz) of four Octaves of Western-scale notes

|   | C | C# | D | Eb | E | F | F# | G | G# | A | Bb | B |
|---|---|---|---|---|---|---|---|---|---|---|---|---|
| 0 | 16.35 | 17.32 | 18.35 | 19.45 | 20.60 | 21.83 | 23.12 | 24.5 | 25.96 | 27.5 | 29.14 | 30.87 |
| 1 | 32.70 | 34.65 | 36.71 | 38.89 | 41.20 | 43.65 | 46.25 | 49.00 | 51.91 | 55.00 | 58.27 | 61.75 |
| 2 | 65.41 | 69.30 | 73.42 | 77.78 | 82.41 | 87.31 | 92.50 | 98.00 | 103.8 | 110.0 | 116.5 | 123.5 |
| 3 | 130.8 | 138.6 | 146.8 | 155.6 | 164.8 | 174.6 | 185.0 | 196.0 | 207.7 | 220.0 | 233.1 | 246.9 |

Moreover, as is evident from the Table 1 frequency values in a Western scale, the higher octaves of each note are integer multiples of the lower octave(s). In certain preferred embodiments, the system will transform the each note or distinct frequency to have the same azimuth angle coordinate as the other octaves of the same note, but with different polar angle coordinates. As one example, an embodiment according to the above preference will transform a "D" note (i.e., frequency=36.71 Hz) of the third octave to have a first azimuth angle coordinate (e.g., $φ_1$) and a first polar angle coordinate (e.g., $θ_1$), and will transform a "D" note of the fourth octave (i.e., frequency=73.42 Hz) to have the same first azimuth angle coordinate (e.g., $φ_1$) but a different or second polar angle coordinate (e.g., $θ_2$).

[1] https://piano-ology.com/scales-middle-eastern-theory-ear-training/#:~:text=The%20scale%20structure%20of%20the,keys%20are%20letter%20names.

In one example of a hardware-software system implementing the present disclosure, the system may comprise a host system and at least one Digital Signal Processor (DSP) subsystem that incorporates at least one digital to analog converter, DSP program memory, DSP data memory, a sampling clock, anti-aliasing and anti-imaging filters and a DSP computing engine controllable by DSP algorithm software and accessible via a host interface to allow the DSP subsystem to receive commands from and communicate with the host system in which the DSP subsystem is embedded. The host system may incorporate a graphical user interface (GUI) as described further below that enables the programming of the DSP algorithm software via the host interface by loading the audio processing filters 202 and look-up tables 230 from either the host system memory or DSP program memory for subsequent processing of sound energy inputs by the DSP computing engine. A user may direct the host system resources and DSP subsystem resources via a GUI as described further below to sample sound energy at a system audio input and process the time-domain assessed audible characteristics for each octave 10 and for each of the plurality of distinct frequencies 206 indicated by the user or by preset music scales preprogrammed in the DSP algorithm software. The time-domain assessed audible characteristics transformed by the look-up tables 230 and then written to system host memory and that may be read out as graphics processing data 27 for display on a monitor or display and a three-dimensional visualization of the sound energy.

Figure 4:
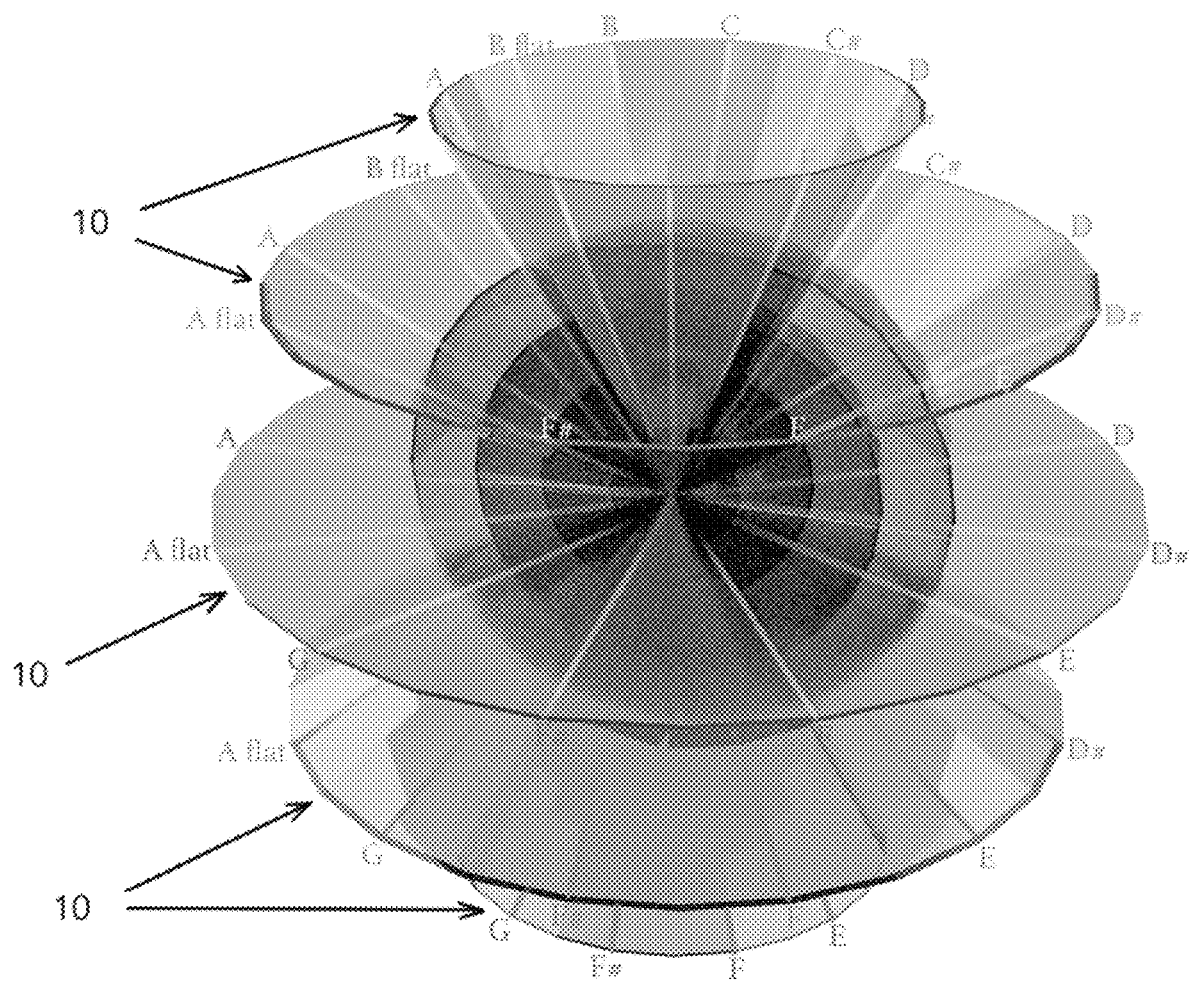
FIG. 4 illustrates a radial geometric visualization comprising the graphing or three-dimensional visualization of transformed time-domain assessed audible characteristics for the distinct frequencies of the Western music scale for five octaves 10.
Figure 5:
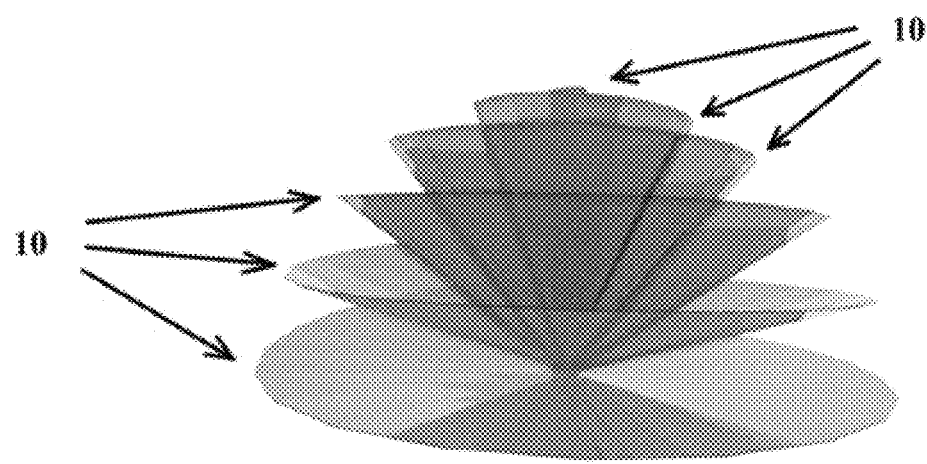
FIG. 5 illustrates a three-dimensional visualization of a scale played through four octaves 10 and the coordinates connected by a line.
Figure 6:
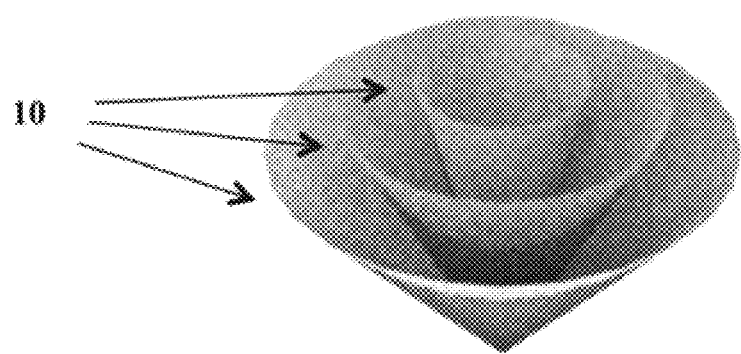
FIG. 6 illustrates a three-dimensional visualization of three octaves in spherical coordinates.
Figure 7:
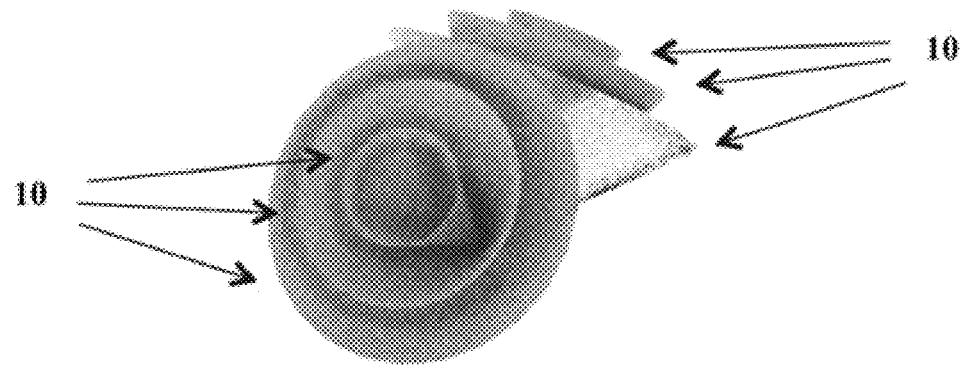
FIG. 7 illustrates a three-dimensional visualization of a plurality of octaves in spherical coordinates, wherein the visualization may comprises a duplicate of the same octaves transformed onto a two sets of coordinates with orthogonal axis or six octaves with three octaves on first axis and a second three octaves on a second axis that is orthogonal to the first axis.

Additional examples of three-dimensional visualization created by the system described are illustrated in FIGS. 4-7. FIG. 4 illustrates a three-dimensional visualization of time-domain assessed audible characteristics of five octaves of the Western 12-note scale. One octave of notes is represented as polar coordinates on a plane including the azimuthal axis (e.g., θ≠0 and φ=0), and four octaves of notes are represented as coordinates in or on four cones (e.g., θ≠0 and φ≠0), with two octaves above the azimuthal or equatorial axis and two octaves below the azimuthal or equatorial axis. Further, the time-domain index that corresponds to a specified time interval is represented as the concentric circles that expand or radiate outward from the origin of the axis with increasing time. Thus, for each sample of audio, whether sampled or read, there is a time-domain assessed frequency characteristic that may be transformed, such as by mathematical calculation or mapping, to a spherical coordinates, and more preferably, a plurality of assessed frequency characteristics may correspond to tones in a recognized music scale and the notes in each octave of the scale may be mapped with distinct angles relative to the azimuthal axis but with the same angle with respect to the polar axis such that the notes in each octave are included either in a plane that includes the azimuthal axis or on the surface of a cone originating from the intersection of the polar and azimuthal axis. As another example of a three-dimensional visualization, FIG. 5 illustrates a spiral comprising the coordinates created by drawing a line from and between each coordinate that corresponding to the same tone as the tone progresses from the fourth to the first octave or vice versa depending on how the visualization is designed. FIG. 6 illustrates a three-octave cone on a single horizontal and vertical axis, however the system enables visualizations on alternate or additional axes with the same or a different origin or origins. As an example, FIG. 7 illustrates system mapping of six octaves to spherical coordinates represented on two distinct axes (three octaves each mapping) with the same origin, which in the illustrated case are orthogonal axes but need not be.

Figure 8:
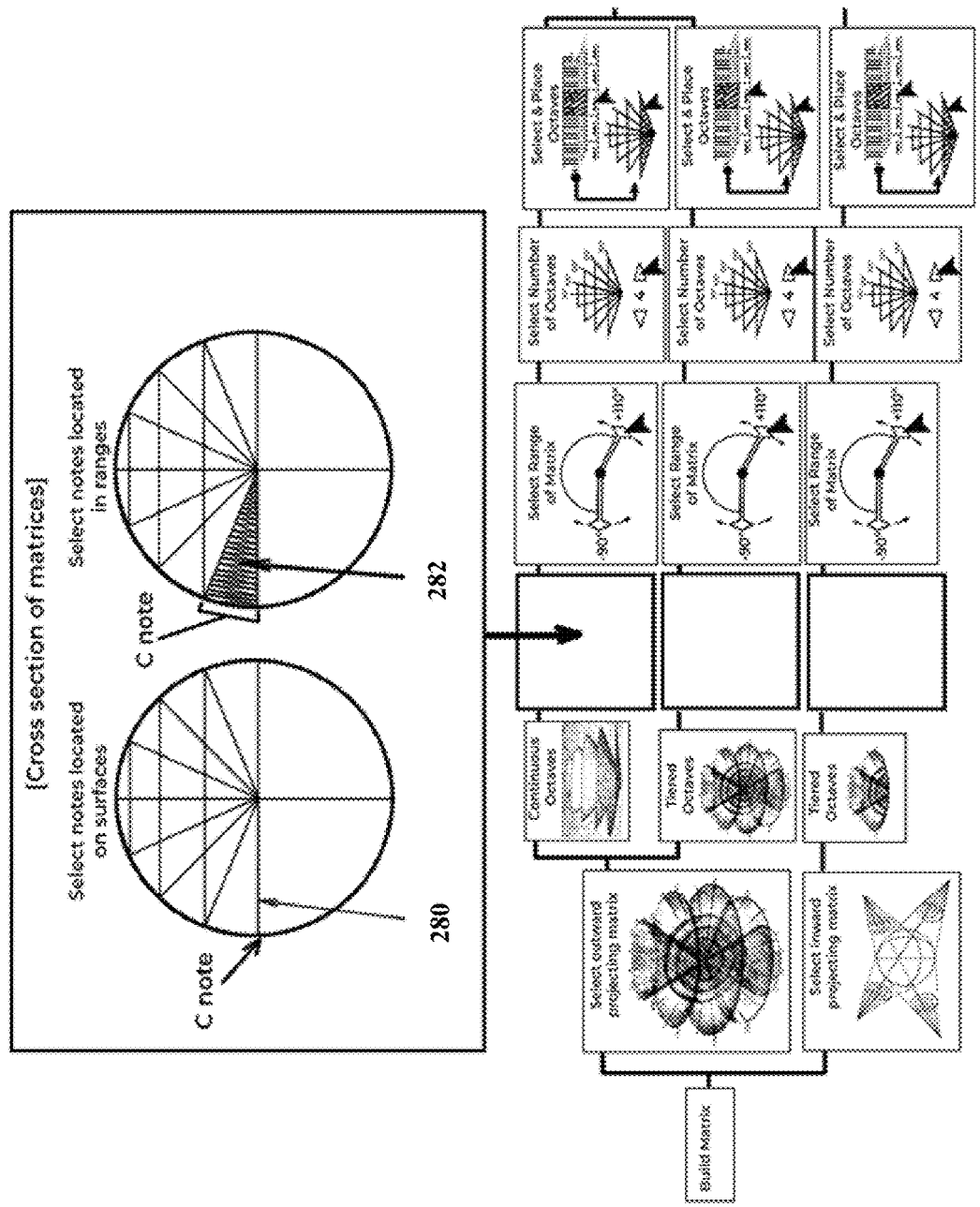
FIG. 8 illustrates a process for selecting between point coordinate visualizations and range coordinate visualizations wherein if point coordinate visualizations are selected the transformed spherical coordinates for a given frequency within a first range of frequencies (e.g., first octave) may have a first transformed polar angle coordinate "$\theta_{n-2}$", and the transformed spherical coordinates for a second frequency within a second range of frequencies (e.g., second octave) may have a second transformed polar angle "$\theta_{n-1}$", and if range coordinate visualizations are selected, the transformed spherical coordinates for a given frequency within a first range of frequencies (e.g., first octave) may have a first transformed polar angle coordinate "$\theta_{n-2}$" between a first polar angle range limit, "$\theta_a$", and a second polar angle range limit, "$\theta_b$", and the transformed spherical coordinates for a second frequency within a second range of frequencies (e.g., second octave) may have a second transformed polar angle "$\theta_{n-1}$" between a third polar angle range limit, "$\theta_c$", and a fourth polar angle range limit, "$\theta_d$".
Figure 9:
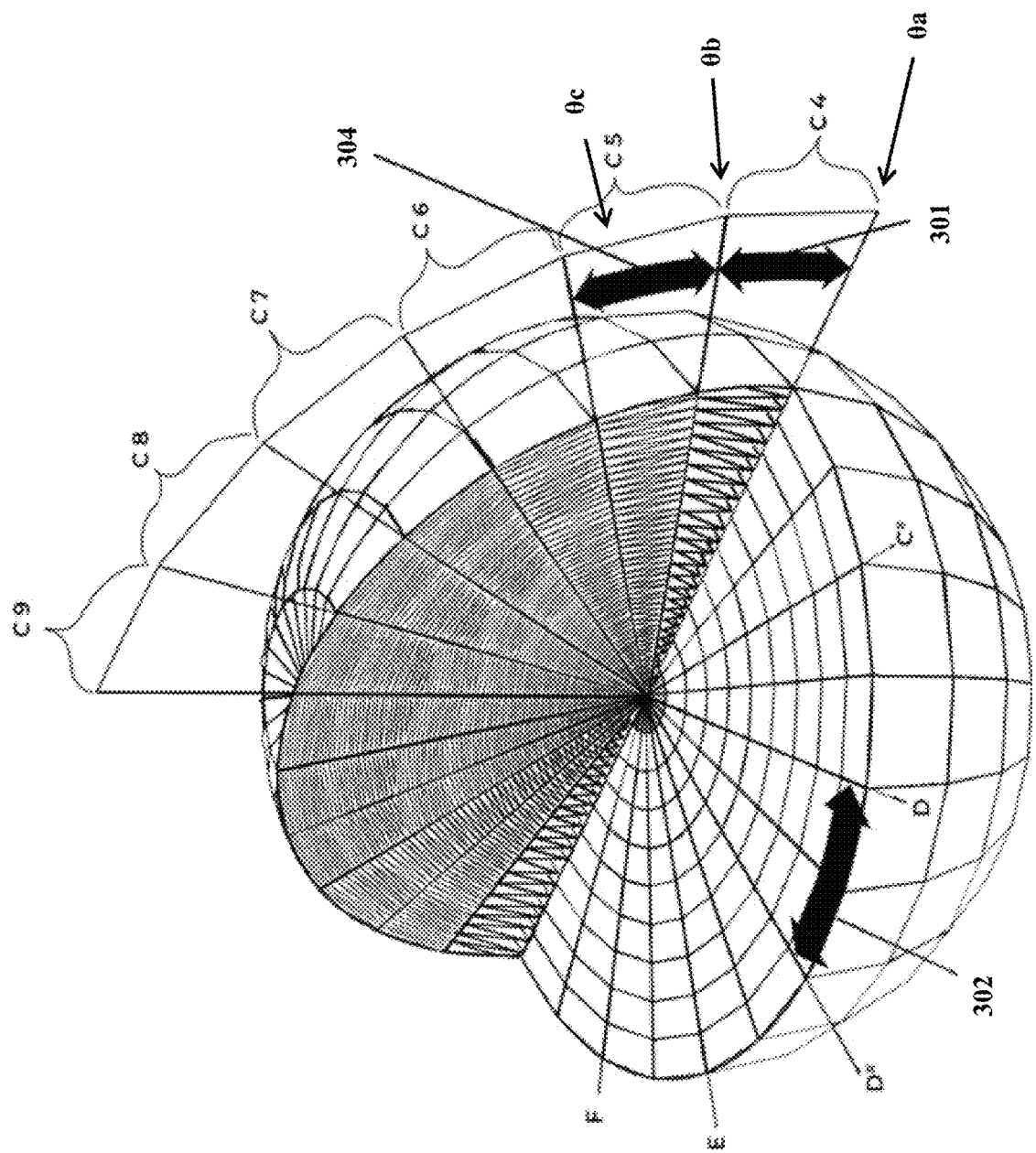
FIG. 9 illustrates the concept of range coordinate visualizations wherein the coordinate comprising the azimuthal angle "phi" ("$\varphi$") for each transformed frequency or note is mapped to a specific angle relative to the other notes and to a reference axis and the coordinate comprising the polar coordinate for each transformed frequency or note is determined as described by process in FIG. 8.

In yet another preferred embodiment, the sound energy in an audio or audible input comprised of plurality of ranges of frequencies (i.e., an audio clip or stream of music containing multiple octaves of notes) may be transformed, such as by mathematical calculation or by mapping, to three-dimensional (e.g., spherical) coordinates from a periodic function that swings, oscillates, transitions, or ranges between a first and second polar angles around "r" as a frequency-rangeaxis or octave-axis and the coordinate position is determined by the intersection of the periodic function and the time interval "r", referred to herein as a "range coordinate visualization or matrix." An illustration of the concept and a flow diagram for building a matrix or three-dimensional visualization is illustrated in FIG. 8, which also shows that the system enables the selection of the point coordinate visualizations 280 and range coordinate visualizations 282. In a point coordinate visualization or matrix, the note-frequency coordinates will map to a point on a surface of a cone or a plane depending on the octave 280. If a range coordinate visualization is selected, the note-frequency coordinates will map to a polar coordinate between two designated polar angle ranges set for that octave depending on when the mapping or calculation determines where the polar angle coordinate should be according to the radial coordinate "r" 282. In such an embodiment for range visualization of frequencies, the range of frequencies will appear distributed concentrically around at least one common axis but the surface will not resemble a right-circular cone with a flat surfaced or plane but instead have an irregular surfaced circular cone shape envelope shape that matches that of the waveform of the periodic function used to transform the frequencies into spherical coordinates. FIG. 8 also illustrates that alternate transformations of the sampled or read audio into coordinates enables visualization of the frequencies as an outward projecting matrix, for which the transformations produce coordinates with the same origin, and potentially more than one pair of orthogonal axes, and an inward projecting matrix of coordinates wherein the transformations produce three dimensional visualizations of geographical shapes that originate from more than one origin and have more than one pair of orthogonal axes. FIG. 9 further illustrates the concept of range coordinate visualizations. In the visualization, the transformed spherical coordinates for a given frequency within a first range of frequencies may have a first transformed polar angle coordinate "$\theta_{n-2}$" between a first polar angle range limit, "$\theta_a$", and a second polar angle range limit, "$\theta_b$", and the transformed spherical coordinates for a second frequency within a second range of frequencies may have a second transformed polar angle "$\theta_{n-1}$" between a third polar angle range limit, "$\theta_b$", and a fourth polar angle range limit, "$\theta_c$". In the illustrated example of FIG. 9, note-frequencies in octave 4 may be transformed into coordinates with a polar coordinate within the range "$\theta_a$" to "$\theta_b$" depending on the intersection of the periodic function and the time interval "r." Note-frequencies in octave four are distributed around the matrix or visualization from 0 degrees to 360 degrees depending on the actual note frequency 301. Notes in octave 5 may have a polar coordinate between within the range "$\theta_b$" to "$\theta_c$", again depending on the intersection of the periodic function and the time interval "r." In this matrix or visualization example, the user has directed the system to visualize the sound energy for nine octaves although any number of octaves may be so directed, and in this case the each of the nine octaves represents an equal range of polar angle coordinate range from −90 degrees to +90 degrees as measured from the azimuth angle axis 304. The notes azimuth angle coordinate however is determined by its precise frequency relative to a reference angle and the azimuth angle coordinates designated for the other note-frequencies 302. Moreover, the transformed spherical coordinates in range coordinate visualizations may be mapped or calculated from a periodic function that ranges or oscillates about a range center axis that radiates from the origin and that range center axis may comprise the set of radial coordinates "$r_{(i-1)}$" for any given range of frequencies, such as an octave. Further, while the illustrated periodic function is a triangle-wave that originates from the origin and transitions about an axis comprised of the set of radial coordinates "$r_{(i-1)}$" for the given range of frequencies, a sinusoid, square or other period function could also be used to produce spherical coordinates for range coordinate visualizations.

Figure 10:
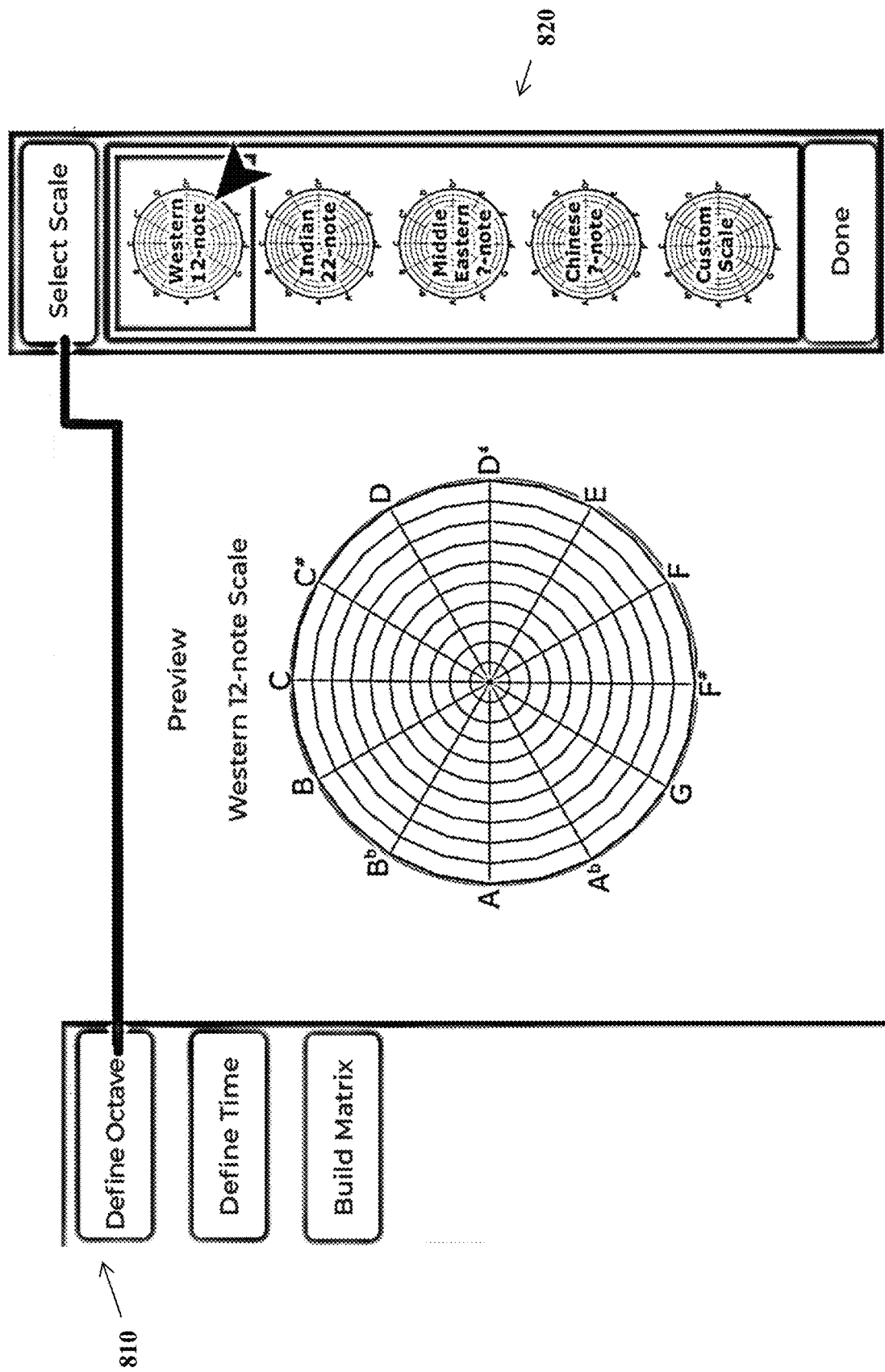
FIGS. 10-13 illustrate windows of a graphical user interface for control of the system for generating three-dimensional visualizations.
Figure 11:
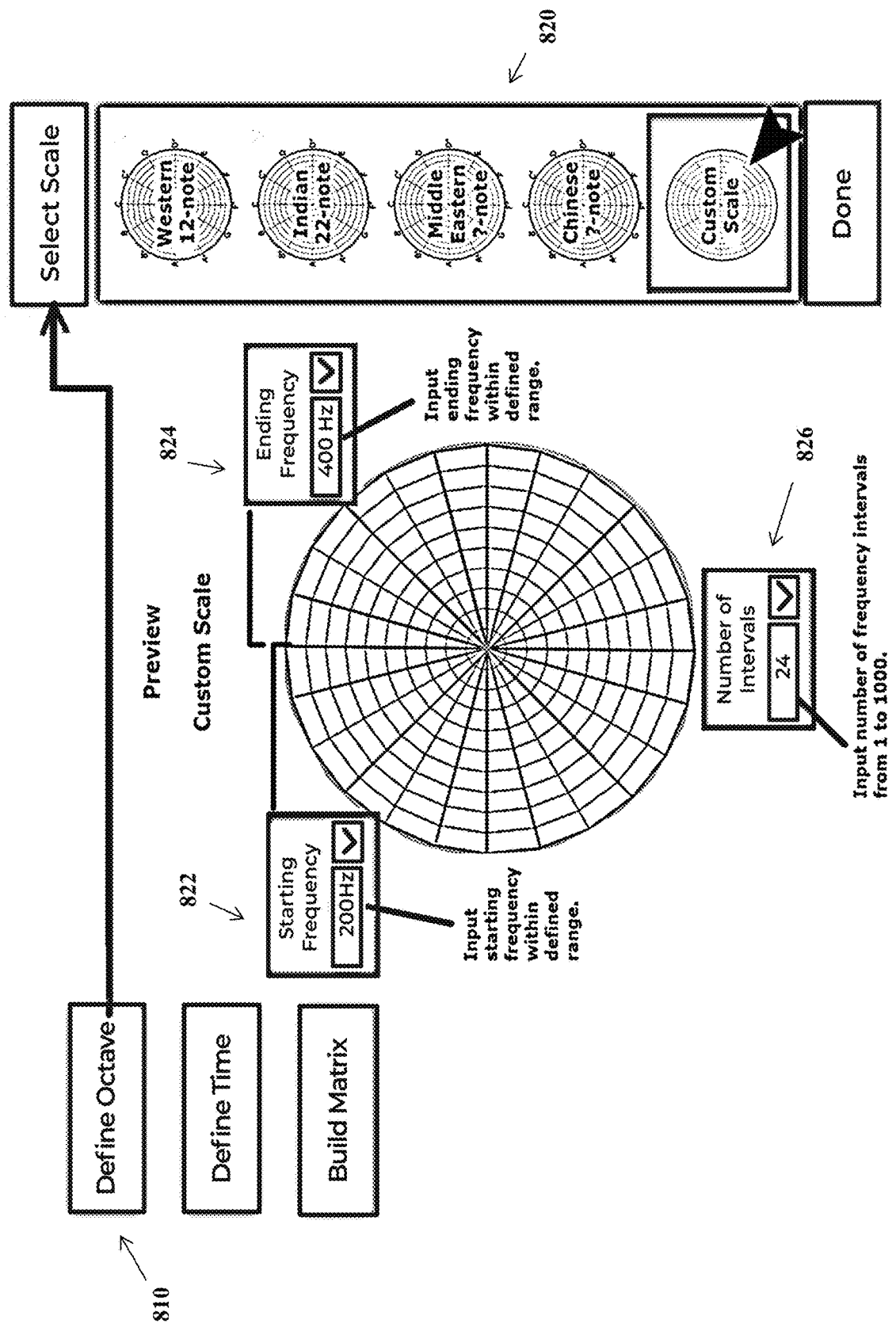
Figure 12:
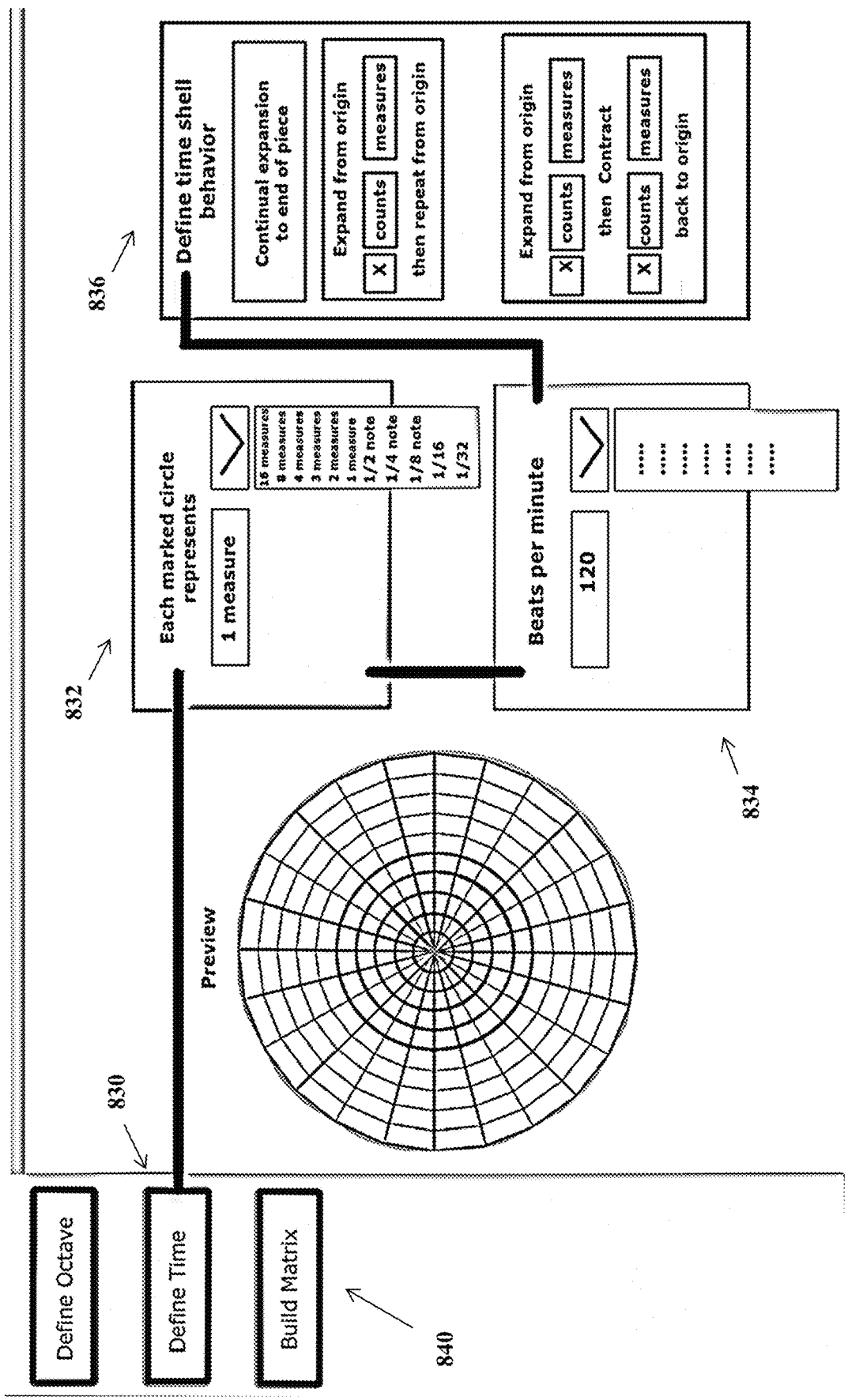
Figure 13:
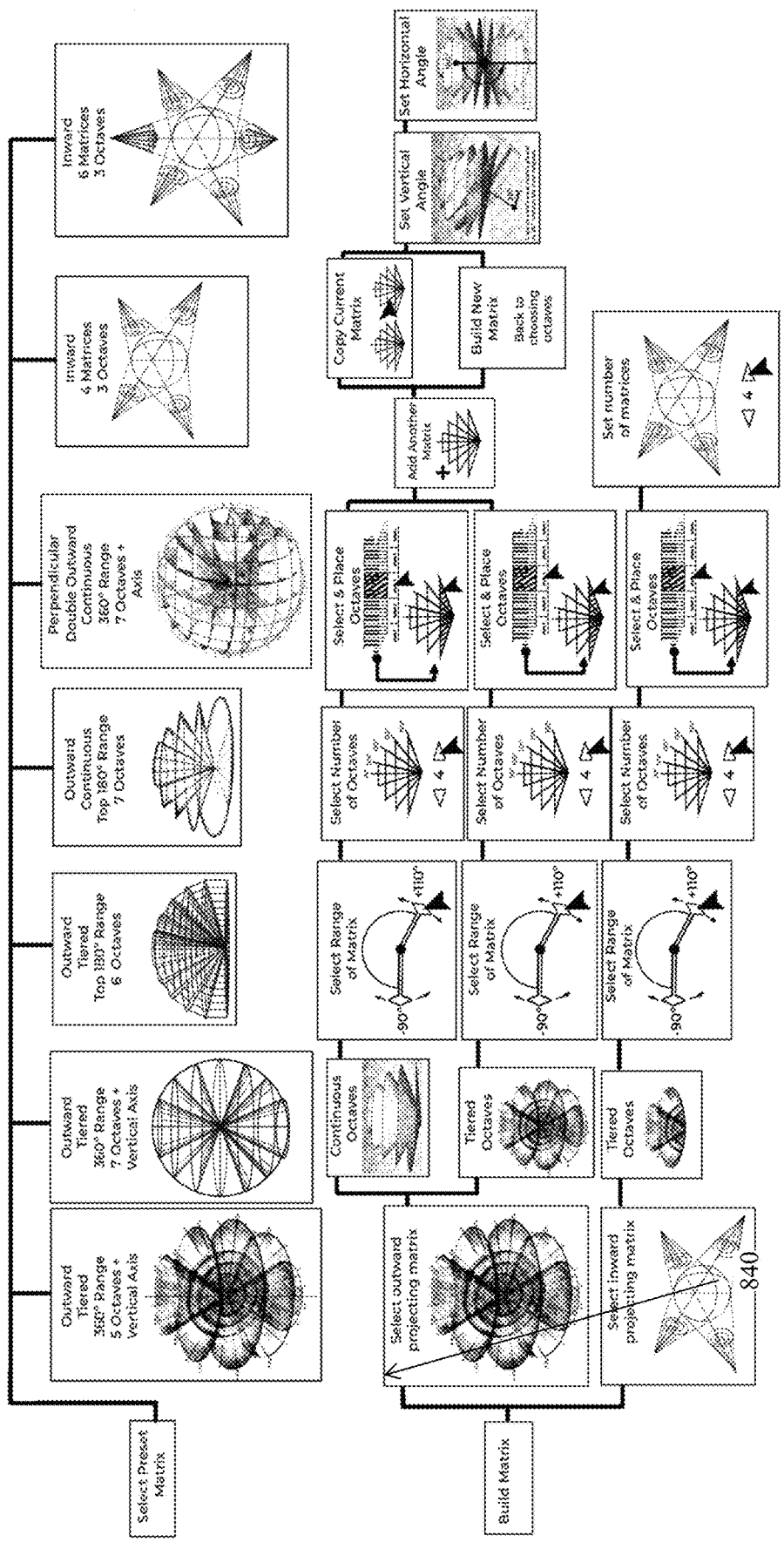

FIGS. 10-13 illustrate a graphical user interface (GUI) for a three-dimensional visualization system for audible inputs. In FIG. 10, a GUI window that includes a Define Octave control 810 that calls a Select Scale Control 820 enables user selection of assessed frequency characteristic variables including but not limited to selection of commonly recognized music scales, such as scales selected from Western 12-note, Indian 22-note, Middle Eastern 8-note, a Chinese 5-note, or a Custom Scale. Moreover, if the user chooses to create a custom scale, the GUI includes a Starting Frequency Control 822, an End Frequency Control 824, and the Number of Frequency Intervals Control 826 to be assessed and mapped for display, the number of octaves that will be included in the displayed visualization and the number of frequency intervals. In use, the user will choose a matrix or three-dimensional visualization with a defined set of octaves, for example, octaves 3 through 7. The three-dimensional visualization system with a GUI as described will input sound energy (or may receive another form of musical input such as MIDI data streams or files) and will generate coordinates for note-frequencies and octaves selected and present in the sound energy or musical input that correspond to the note-frequencies and octaves designated by the user in the GUI. Thus, if a frequency input falls within the range including the lowest note (frequency) and the highest note (frequency) defined for octave 4 (for example), then the system will generate coordinates as described herein as a point on a surface (or as a point on an range-surface as described for a range-visualization). The GUI provides two-dimensional display of the variables selected by the user choice of options in the Select Scale Control 820 and will display a preview of the frequency intervals, and which also corresponds to the number of angles $\theta_{(p-1)}$ in the visualization, around a circle. See FIG. 11. The Define Time control 830 calls a Measure Control 832, a Beats per Minute control 834, and a Define time shell behavior control 836 that collectively enable the user to define how densely mapped the spherical coordinates are spaced relative to the input or mapping and hence visualization will appear based on the controls. See FIG. 12. FIG. 13 illustrates a Build Matrix control 840 (in FIG. 12) with preset visualizations including a 5 octave 360° Matrix, a 6-octave spiral top 180° Matrix, a 10 octave 360° Matrix, and options for alternate 3, 4 and 6 180° and 360° axis matrices as well as inward projecting matrices. Alternatively, a set of custom matrix controls are provided to enable the user to set the parameters of the matrix to be used for visualization.

Figure 14:
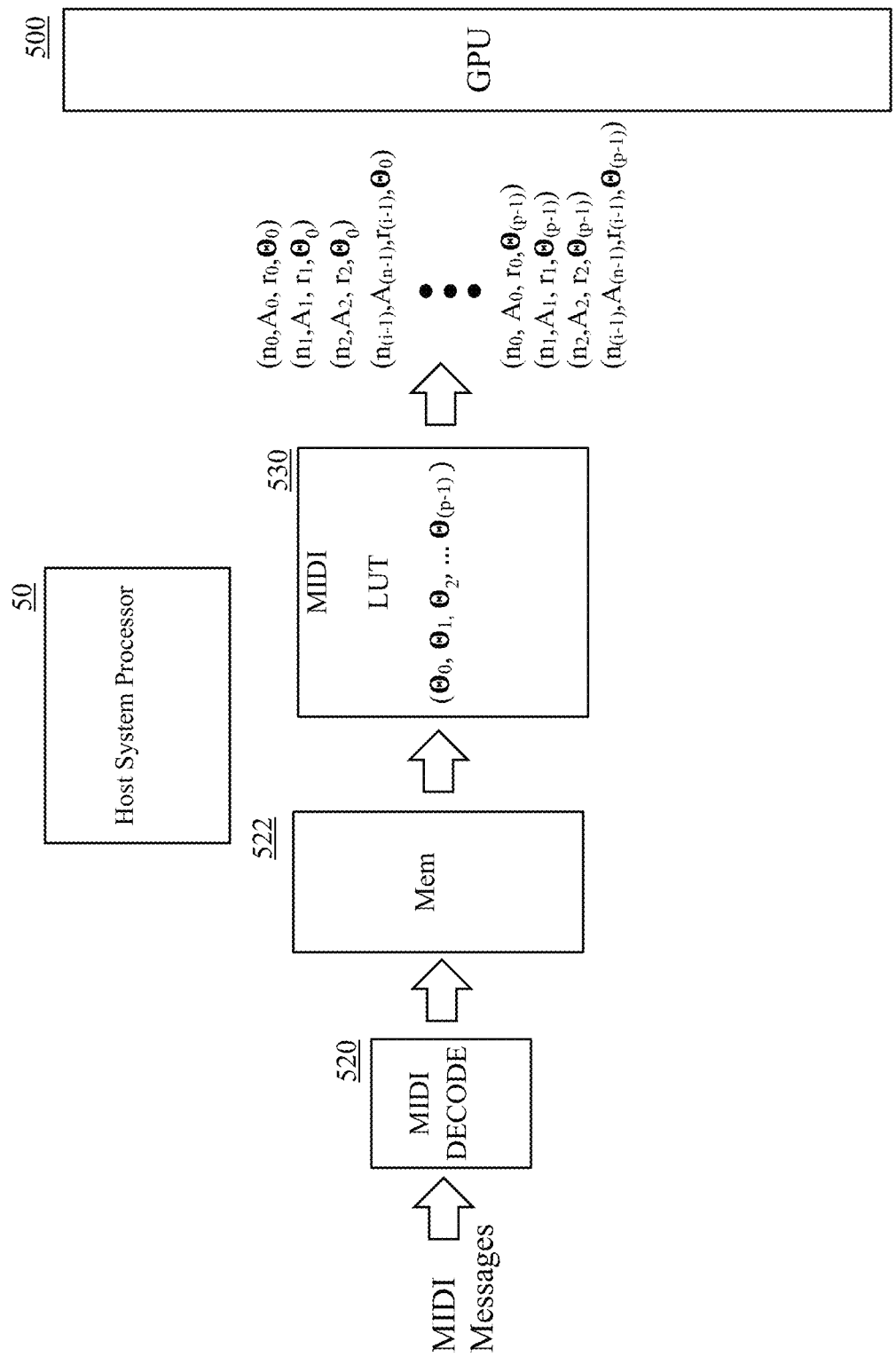
FIG. 14 illustrates a system block diagram for converting MIDI message data to three-dimensional coordinates to generate three-dimensional visualizations.

In another embodiment option, the system may be used to create spherical or other three-dimensional coordinates to visualize a Musical Instrument Digital Interface (MIDI) stream or file comprised of MIDI messages. A system block diagram for decoding and visualizing MIDI messages is illustrated in FIG. 14. In a preferred system, a host system processor 50 is functionally coupled to host system memory 522 and the GPU 500. The host system may operate under software processes to decode MIDI Messages, such as with a MIDI Decode utility 520, which may call software scripts or processes to decode the MIDI Messages, and subsequently write the decoded MIDI message data to host system memory 522. Example of MIDI translator or interpreter utilities include MIDI Tools™ from Mountain Utilities (https://mountainutilities.eu/miditools) MIDI-OX (http://www.midiox.com/), or the pretty_midi utility that contains functions or classes that enable capturing, filtering and saving MIDI input messages to system memory or data files as MIDI message data, and from which a list or sequence of note events may be created and further parsed by host system software to decode and translate the MIDI events into three-dimensional coordinates according to the teachings herein. An example of MIDI message data output from a MIDI decode utility 520 is included in Table 2.

TABLE 2

Example of MIDI Decode Output

| Timing ticks | Status/MIDI Message | Note Number/Note | Velocity |
|---|---|---|---|
| 30 | 0x9c/NOTE ON | 69/A4 | 100 |
| 30 | 0x9c/NOTE ON | 55/G3 | 64 |
| 35 | 0x9c/NOTE ON | 57/A3 | 100 |
| 40 | 0x9c/NOTE ON | 67/G4 | 70 |
| 45 | 0x8c/NOTE OFF | 69/A4 | 0 |
| 50 | 0x8c/NOTE OFF | 55/G3 | 0 |

The host hardware-software system may parse the MIDI message data in host system memory 522 to read timing information, note numbers, and volume information, and other MIDI message data and process the MIDI message data according to a MIDI Look up Table 530 to generate three dimensional coordinates according to the description herein. An intensity may be correlated to and proportional to the velocity information associated with each MIDI message. Accordingly, coordinates generated by a software system according to the description will include a radial coordinate "r" (distance to origin) that is related to or proportional to the MIDI timing information encoded in the MIDI message, an amplitude or loudness coordinate "A" that is proportional to the velocity information included in the MIDI message, an azimuthal coordinate proportional to the note number in the MIDI message, and a polar coordinate dependent on the octave of the note expressed in the MIDI message.

A user of the GUI may select a point coordinate visualization 280 of MIDI messages. As before with sound energy, it is preferred that MIDI messages of different octaves generate coordinates that display alternate surfaces. In this case, the software system generates coordinates for MIDI notes in a first range of frequencies (i.e., that correspond to a first octave) generates GPU data that correspond to a first surface, and MIDI notes in in a second range of frequencies (i.e., a second or different octave) generate GPU data that correspond to a second surface. Further, and as before, transformed spherical coordinates of the MIDI notes in each octave of the scale may be mapped with distinct angles relative to the azimuthal axis but with the same angle with respect to the polar axis such that the MIDI notes in each octave are included either in a plane that includes the azimuthal axis or on the surface of a cone originating from the intersection of the polar and azimuthal axis. In the event that a user selects a range coordinate visualization 282, the MIDI notes in a first range of frequencies that correspond to a first octave may have a first transformed polar angle coordinate "$\theta_{n-2}$" between a first polar angle range limit, "$\theta_a$", and a second polar angle range limit, "$\theta_b$", and the transformed spherical coordinates for a second range of frequencies that correspond to a second octave may have a second transformed polar angle "$\theta_{n-1}$" between a third polar angle range limit, "$\theta_b$", and a fourth polar angle range limit, "$\theta_c$". Thus, for each MIDI message, whether sampled or read, there is a time-domain assessed frequency characteristic that may be transformed, such as by mathematical calculation or mapping, to a spherical coordinates, and more preferably, a plurality of assessed frequency characteristics may correspond to tones in a recognized music scale and the MIDI notes in each octave of the scale may be mapped with distinct angles relative to the azimuthal axis but with the same angle with respect to the polar axis such that the MIDI notes in each octave are included either in a plane that includes the azimuthal axis or on the surface of a cone originating from the intersection of the polar and azimuthal axis. Finally, despite that two octaves are described above, it should be obvious that the system hardware and software may be scaled according to the description to enable the visualization of as many as nine octaves of notes or frequencies.

The host software and hardware system may also be scaled to include as many MIDI channels as needed for the complexity of the visualization desired. In such an option, the host hardware-software system to create three-dimensional visualizations includes dedicated software algorithms that enable deconstruction of received MIDI channel(s) messages that is written to host system memory that is subsequently read by the application software to scrape the information to generate coordinates according to the description in this specification. The MIDI converter or interpreter may transform the MIDI message by reading the timestamp of the MIDI Track data (byte 1 of the music data) for each MIDI event to create or transform the radial coordinate for each MIDI event in the MIDI message, the Status byte (byte 2) and bytes 3 may be read to determine the MIDI data note-pitch, and byte 4 to determine the volume of the note.

While various embodiments have been described above, it should be understood that they have been presented by way of example only, and not limitation. Thus, the breadth and scope of a preferred embodiment should not be limited by any of the above-described exemplary embodiments but should be defined only in accordance with the following claims and their equivalents.

The invention claimed is:

1. A system for creating a visualization of sound energy in an audible input, comprising:

an audio processing filter configured to filter time-domain assessed frequency characteristics for a plurality of distinct frequencies, the time-domain assessed frequency characteristics including magnitude and duration at each distinct frequency assessed, the audio processing filter coupled to a processor configured to transform the time-domain assessed frequency characteristics for the plurality of distinct frequencies into a plurality of sets of three-dimensional coordinates, each set of three-dimensional coordinates includes a radial coordinate that relative to an origin is proportional to when each set of three-dimensional coordinates is transformed, a first angle coordinate common to the first plurality of distinct frequencies and a second angle coordinate common to a second set of distinct frequencies, a graphics processing unit to generate graphics processing data to display a visualization of the time-domain assessed frequency characteristics wherein the visualization simultaneously includes a first surface located at a first set of coordinates transformed from the first set of the plurality of distinct frequencies at a distance from the origin in proportion to the radial coordinate of the first set distinct frequencies and a second surface located at a second set of coordinates transformed from a second set of the plurality of distinct frequencies at a distance from the origin in proportion to the radial coordinate of the second set distinct frequencies.

2. The system in claim 1 wherein,
the first surface is selected from a plane or cone and the second surface is a cone.

3. The system in claim 1 wherein,
the plurality of distinct frequencies correspond to musical notes and the first set of the plurality of distinct frequencies comprises a first octave and the second set of the plurality of distinct frequencies comprises a second octave.

4. The system in claim 3 wherein,
the musical notes are selected from Western 12-note scale notes, a Middle Eastern scale tones, an Indian scale tones, and Chinese Scale tones, a custom scale, or a combination thereof.

5. The system in claim 4 wherein,
the custom scale includes a starting frequency, a frequency interval, and a determined number of multiples of the frequency interval.

6. The system in claim 1 wherein,
the processor is configured to transform the time-domain assessed frequency characteristics by a process selected from mathematically calculating the three-dimensional coordinates and selecting the coordinates from a look-up-table.

7. The system in claim 1 wherein,
each set of three-dimensional coordinates includes a third angle coordinate for which multiples of each distinct frequency have a common third angle coordinate.

8. The system in claim 7 wherein,
the multiples of each distinct frequency are octaves of a music scale selected from Western 12-note scale, a Middle Eastern scale, an Indian scale, and Chinese Scale, and a custom scale, or a combination thereof.

9. The system of claim 1 wherein the radial coordinate further corresponds to a radius and the visualization includes a spherical surface with the radius.

10. A method of producing a three-dimensional visualization of sound energy in an audio input:
for each of a plurality of distinct frequencies, sampling the audio input to create a plurality of samples, each sample comprised of relative magnitude characteristic proportional to the sound energy present at the distinct frequency sampled and a time index proportional to the sequence of the occurrence of each sample;
transforming each sample into a set of coordinates which for each of the plurality of distinct frequencies, the set of coordinates includes a unique polar angle coordinate and azimuth angle coordinate combination, and a radial coordinate that is proportional to the time index;
converting each set of coordinates into graphics display data; and
producing a graphical three-dimensional visualization of the graphics display data wherein the three-dimensional visualization for each unique polar angle coordinate and azimuth angle coordinate combination extends from an origin a distance proportional to the time index.

11. The method in claim 10 wherein
each of the set of coordinates also includes a relative magnitude coordinate.

12. The method in claim 10 further comprising
a first range of the plurality of distinct frequencies have a common first polar angle coordinate and a second range of the plurality of frequencies have a common second polar angle coordinate, and the graphical three-dimensional visualization comprises a first surface composed of the coordinates from the first range of the plurality of distinct frequencies and a second surface composed of the coordinates from the second range of distinct frequencies.

13. The method in claim 12 further comprising
assigning a unique azimuthal angle coordinate for each distinct frequency within the first range of the distinct frequencies, and the same azimuth angle coordinate to an integer multiple of the distinct frequency in the second range of the distinct frequencies.

14. The method of claim 10 wherein,
the plurality of distinct frequencies are selected from a Western 12-note scale tones, a Middle Eastern scale tones, an Indian scale tones, and Chinese Scale tones, a custom selection of tones, or a combination thereof.

15. The method in claim 14 wherein,
the first range of frequencies comprise a first octave and the second set of frequencies comprises a second octave.

16. The system of claim 10 wherein
a first subset of the plurality of distinct frequencies share a first polar angle coordinate and a second subset of the plurality of distinct frequencies share a second polar angle coordinate and the visualization includes a first cone comprised of the first subset of the plurality of distinct frequencies and a second cone comprised of the second subset of the plurality of distinct frequencies, and the time index corresponds to a radius and the visualization includes a spherical surface with the radius.

17. A graphical user interface for a system to create a visual display of the audio energy in an audio source, the system configured to transform the audio energy at a plurality of distinct frequencies into coordinates for a three-dimensional display of the audio energy, comprising:
a control to define a time interval between successive coordinates for the simultaneous three-dimensional display of the successive coordinates comprised of first and second sets of coordinates, the position of the three-dimensional display of the first set of coordinates corresponds a first spherical surface and the position of the three-dimensional display of the second set of coordinates corresponds a second spherical surface at a different distance from an origin than the three-dimensional display of the first set of coordinates in proportion to the time interval between the first and second set of coordinates; and
a control for selecting a music scale selected from Western 12-note scale notes, a Middle Eastern scale tones, an Indian scale tones, and Chinese Scale tones, a custom scale, or a combination thereof.

18. The graphical user interface in claim 17 further comprising
a control to define how many octaves of the audio source to visualize, the control including a sub-control for selecting a starting frequency, an ending frequency, and the number of frequency intervals between the starting and ending frequencies.

19. The graphical user interface in claim 17 further comprising a control to define parameters of the visualization, the parameters including the number of axes on which the coordinates will be displayed.

20. A method of producing a three-dimensional visualization of MIDI messages:
   for each of a plurality of MIDI messages, decoding the MIDI message data into a collection of timing data, note data, and velocity data;
   transforming each collection of timing data, note data, and velocity data into a set of three-dimensional coordinates for which each of the plurality of distinct note data includes a unique polar angle coordinate and azimuth angle coordinate combination;
   converting each set of coordinates into graphics display data; and
   producing a graphical three-dimensional visualization of the graphics display data.

* * * * *